United States Patent
Lassota

(10) Patent No.: US 7,886,655 B1
(45) Date of Patent: Feb. 15, 2011

(54) BEVERAGE BREWER WITH INSULATED BREW BASKET ASSEMBLY, INSULATED BREW BASKET AND METHOD

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 1143 days.

(21) Appl. No.: 11/050,521

(22) Filed: Feb. 3, 2005

Related U.S. Application Data

(60) Provisional application No. 60/542,759, filed on Feb. 6, 2004.

(51) Int. Cl.
*A47J 31/00* (2006.01)

(52) U.S. Cl. .............................. 99/306; 99/307; 99/323

(58) Field of Classification Search .................... 99/306, 99/323, 304, 307, 295; 220/574.3, 592.24, 220/592.25, 592.26, 592.28
See application file for complete search history.

(56) References Cited

U.S. PATENT DOCUMENTS

| | | | | | |
|---|---|---|---|---|---|
| 4,653,469 | A | * | 3/1987 | Miyaji et al. ............. | 126/390.1 |
| 4,771,680 | A | * | 9/1988 | Snowball et al. ............... | 99/295 |
| 5,000,082 | A | * | 3/1991 | Lassota ........................ | 99/304 |
| 5,570,623 | A | * | 11/1996 | Lin ............................... | 99/285 |
| 5,653,362 | A | * | 8/1997 | Patel ............................. | 222/156 |
| 5,678,725 | A | * | 10/1997 | Yamada et al. ............ | 220/592.21 |
| 6,079,316 | A | * | 6/2000 | Barden et al. .................. | 99/297 |
| 6,119,889 | A | * | 9/2000 | Fujii et al. ............... | 220/592.27 |
| 6,161,720 | A | * | 12/2000 | Castle ..................... | 220/592.17 |
| 6,530,496 | B2 | * | 3/2003 | Moran ......................... | 220/603 |
| 6,889,599 | B2 | * | 5/2005 | Koslow ......................... | 99/306 |

* cited by examiner

*Primary Examiner*—Reginald L Alexander
(74) *Attorney, Agent, or Firm*—James W Potthast; Potthast & Associates

(57) ABSTRACT

An insulated brew basket assembly (12) having a metallic brew basket body (54) with an external surface covering non-metallic, insulating material (62) having a heat conductivity characteristic that is significantly less than that of the metal of the basket body (54), such as an insulating coating adhered to the inside, the outside or both the inside and the outside of the surrounding wall, an internal insulating liner fixedly or releasably attached to the surrounding wall at the inside or a releasably or permanently attached insulating jacket covering the outside of the surrounding side wall. The brew basket body may have a double-wall construction with an interior wall section (70) connected with an exterior wall section (72) in spaced relationship to define a gap (68), within which a non-metallic, insulating material, such as (a) a relative vacuum, (b) air at normal ambient air pressure, (c) an inert gas, (d) a foam insulation material and (e) a substantially solid plastic material, is protectively contained within the gap (68), is contained. The beverage is brewed in the insulated brew basket assembly (12) while being insulated to reduce heat loss and temperature loss of the beverage being passed to a dispenser (46) of a brewer.

73 Claims, 3 Drawing Sheets

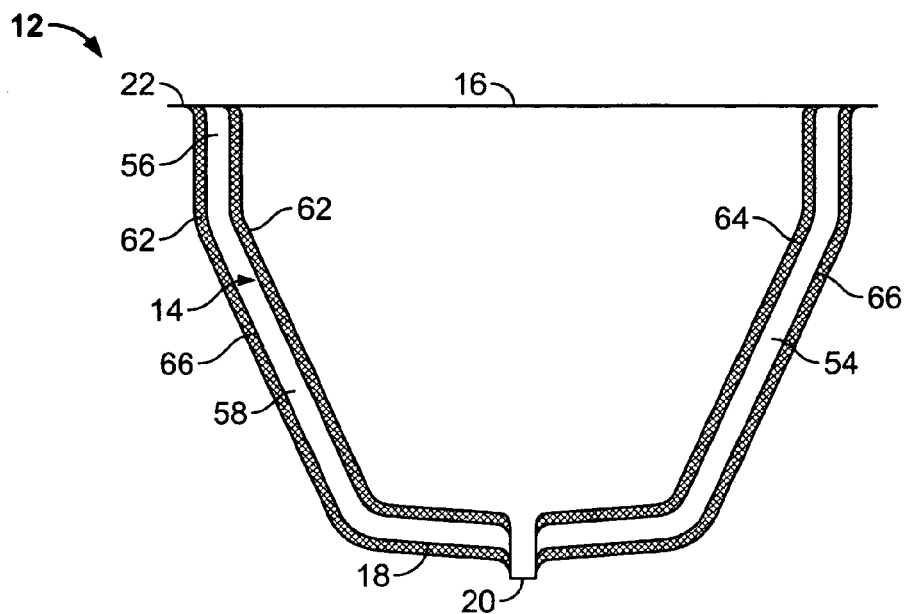
FIG. 4
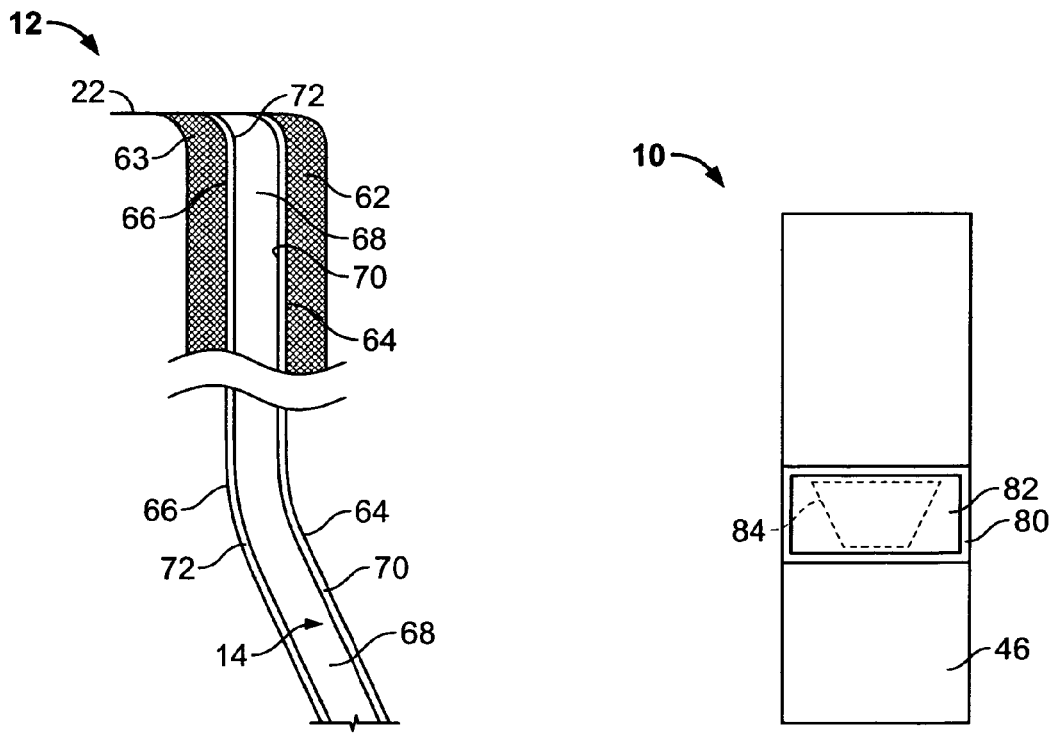
FIG. 5
FIG. 6

BEVERAGE BREWER WITH INSULATED BREW BASKET ASSEMBLY, INSULATED BREW BASKET AND METHOD

CROSS-REFERENCE TO RELATED APPLICATION

This application claims the benefit under 35 U.S.C. 119(e) of provisional application Ser. No. 60/542,759 filed Feb. 6, 2004 of the present inventor, which is hereby incorporated by reference.

BACKGROUND OF THE INVENTION

1. Field of the Invention

This invention generally relates to hot beverage brewers, brew baskets used with hot beverage brewers and methods of brewing and more particularly to brewing systems in which beverage is brewed directly into insulated dispensers.

2. Discussion of the Prior Art

Beverage brewers of the type that have a source of hot water that is selectively passed though a dry beverage ingredient, such as ground coffee beans or tea leaves, held within a filter paper that, in turn, is held in a filter holder within a metal brew basket body. The brew basket body is has an open top and a bottom with a drain hole. The hot water is slowly passed though the layer of ingredient to create freshly brewed beverage that passes though the filter paper and out of the drain hole. The hot beverage passes directly from the drain hole into an inlet of an insulated dispenser. At the end of the brew cycle, the filled insulate dispenser may be removed to a remote serving location, and another empty insulated dispenser is moved to the brewing position beneath the brew basket to enable the commencement of another brew cycle. Before a new brew basket can commence, the brew basket is removed from beneath the source of hot water to enable removal of the spent ingredient from the prior brew cycle and the supporting filter paper from the open top of the brew basket and a new filter supporting a preselected quantity of unused dry beverage ingredient is installed into the brew basket, and the brew basket is returned to an operative position beneath the hot water source. Alternatively, if the brew basket may be separated from the brewer, a new brew basket with a new load of ingredient is substituted for the brew basket used during the prior brew cycle. In some brewing systems of high volume, the brew basket is a slidably attached drawer-like member to the brewer housing and is not normally separated from the housing.

For further details of the types of brewers to which the present invention generally relates, reference should be made to the following United States patents of the present inventor, all of which are hereby incorporated by reference: U.S. Pat. Nos. 5,000,082 issued Mar. 19, 1991 for "Beverage Maker and Method of Making Beverage"; 5,331,885 issued Jul. 26, 1994 for "Semiautomatic Beverage Maker and Method"; 5,943,944 issued Aug. 31, 1999; 6,706,300 issued Mar. 16, 2004 for "Brewing System with Movable Brew Basket Mounting Apparatus and Method" and 6,499,628 issued Dec. 31, 2002 for "Insulated Urn with Heat Retentive Closures and Method".

In all brewers of the type that do not use heaters to maintain the beverage temperature within the dispenser the temperature gradually declines. The temperature of the beverage as it enters the dispenser is the hottest temperature that the beverage will thereafter reach. In order to reduce heat loss through the inlet during the filling of the dispenser, it is known to make the dispenser inlet no larger than necessary to accommodate the maximum beverage flow rate from the drain hole without the beverage backing up and to locate the dispenser inlet closely adjacent to the drain hole. It is also known to reduce heat loss by passing the beverage directly to the bottom of the dispenser through a down tube and to pass the beverage to the inlet of the down tube through an insulated funnel mounted within the top cover of the dispenser. Despite the insulation of the dispenser, the temperature of the beverage gradually declines due to removal of beverage during serving, heat radiation and heat conduction through the insulated top cover and walls of the dispenser.

Eventually the temperature of the beverage will reach the ambient temperature of the location of the dispenser, but long before then, the temperature passes through a preselected minimum serving temperature. When this occurs, in commercial freshly brewed coffee or tea serving establishments, the remaining beverage is no longer served but is dumped and thus wasted.

It is therefore desired to extend the length of time that it takes for the beverage temperature to decline from maximum temperature to the minimum serving temperature. This time duration is directly related to the initial temperature of the beverage when it is first added to the dispenser. This initial composite temperature of the beverage within the dispenser is directly related to the initial temperature of the hot water when it is first added to the beverage. This initial temperature can be controlled to a degree by controlling the initial temperature of the hot water that is added to the beverage ingredient in the brew basket, but this temperature cannot be made hotter than the boiling point of the water. However, the optimal flavor results are generally obtained when the hot water is several degrees beneath the boiling temperature of the water. Regardless of the temperature of the hot water, the inventor has noted that there is significant heat loss within the brew basket due to conduction of heat though the side walls and bottom of the metal brew baskets in addition to radiation. The longer the time duration of the brew cycle including the dispense period as well as the drip period and any pre-wetting period, the greater is the reduction in temperature, but there are limits to how short the brew cycle can be made, and different preselected, brew cycle times have been determined for different quantities and different types of ingredient to obtain optimal flavor and other beverage ingredient extraction, and it is therefore undesirable to vary from these time periods.

Because of the heat conduction through the walls and bottom of the metal brew basket, the brew basket becomes heated to a relatively high temperature. This is due to the high level of thermal conduction of the stainless steel that is generally required for purposes of durability, inertness and hygiene and to obtain FDA approval for contact with food in a commercial brewer. After completion of the brew cycle, except for a small residual amount still held by the spent ingredient, all the hot water has passed from the brew basket and the brew basket temperature will begin to decline. Eventually, the brew basket will reach a temperature that is comfortable to the touch and, more importantly, which will not cause burn injury, if touched.

The inventor has noted, however, that in commercial operations, it is often required to rapidly perform successive brew cycles beginning one brew cycle as soon as a prior brew cycle is completed. This requires handling of the brew basket at the end of each brew cycle before there has been sufficient cooling time to safely handle the hot brew basket without risk of pain or burn injury. Even without serious burn injury, the brew basket may be dropped during handling due to the heat pain and the hot wet ingredient spilled. Also, when encountering such risks, employees may be reluctant to rapidly cycle the brewer even when required by demand for high volume production of freshly brewed beverage, resulting in undesirably slow service.

Thus, the inventor has observed that there is a need for improvement in brewers, brewing methods and brew baskets that will overcome the safety and beverage-temperature maintenance problems noted above.

SUMMARY OF THE INVENTION

The object of the present invention is therefore to provide a brewer, a brew basket and a method of brewing that function to reduce heat loss from beverage being brewed while in a brew basket relative to the heat loss and related problems that are present, and to reduce the safety risks and other problems associated with high brew basket temperatures that are present, in know brew baskets, brewers and brewing methods.

This objective is achieved in part by provision of an insulated brew basket assembly having a water impervious, brew basket body having a surrounding, sidewall extending between and surrounding a relatively narrow bottom with a drain hole, and a relatively wider open top for receipt of beverage ingredient and mixing liquid and a non-metallic, insulating, covering material covering at least a portion of the surrounding sidewall, and having a heat conductivity characteristic that is significantly less than that of the sidewall.

In one embodiment, the surrounding sidewall has a double-wall construction with an interior wall section connected with an exterior wall section in spaced relationship to define a closed gap, and the non-metallic, insulating material is located within the gap. The double-walled construction advantageously both enhances the rigidity and strength of the brew basket body and protects the insulating material. Preferably, the surrounding sidewall is made from metal, the non-metallic insulating material substantially fills the entire gap, and the gap is substantially coextensive with the entire surrounding sidewall.

In the case of brew basket assembly with a double-wall construction, the interior wall section has an inwardly facing exterior surface on the inside of the brew basket body and the exterior wall section has an outwardly facing exterior surface, and the non-metallic, insulating covering material covers at least a portion of at least one of the inwardly facing exterior surface and the outwardly facing exterior surface.

In one embodiment, non-metallic, insulating covering material is at least one of (a) a liner made of insulating material that is received within the brew basket body and conforming to and covering at least a significant portion of the inwardly facing surface, (b) a jacket within which the brew basket body is received and conforming to and covering at least a significant portion of the exterior facing surface, and (c) a coating of insulated material that is permanently adhered to at least one of the exterior surfaces. 12. In the case of the non-metallic, insulating covering insulating material being one of the insulating liner and the insulating jacket, an air gap is created between the one of the liner and the jacket, on the one hand, and the associated exterior surface, on the other hand, to provide air gap insulation.

In one embodiment, the water impervious brew basket body is a metallic brew basket body with a single walled construction made of a metal and has an inwardly facing exterior surface on the inside of the brew basket body and an outwardly facing exterior surface on the outside of the body, and the insulating material includes an exterior surface covering non-metallic insulating material with a heat conductivity characteristic that is significantly less than that of the metal of the brew basket body that covers at least a portion of the at least one of the inwardly facing exterior surface and the outwardly facing exterior surface. In such embodiment, the exterior surface non-metallic covering material may be one or more of (a) a liner received within the brew basket body and conforming to and covering the inwardly facing surface, (b) a jacket within which the brew basket body is received and conforming to and covering the exterior facing surface, (c) a coating of insulated material that is adhered to at least one of the exterior surfaces 31.

In an embodiment of the hot beverage brewing apparatus, the insulated brew basket assembly is adapted for use with and is combined with a hot beverage brewing apparatus having a source of hot water, means for selectively dispensing the hot water at a dispense location, a releasable brew basket holder for supporting a insulated brew basket assembly beneath the dispense location to receive the hot water, and an insulated dispenser urn for direct receipt of and temporary storage of the hot beverage received from the insulated brew basket assembly. In keeping with one aspect of the invention, the brew basket holder is contained within an insulated metal compartment within which the insulated brew basket is releasably supported to provide additional insulation.

The objective of the invention is also achieved in part by provision of an insulated brew basket assembly composed of a generally cup-shaped, brew basket body having a surrounding sidewall with a double-wall construction having an interior wall section connected with an exterior wall section in spaced relationship to define a gap between the interior wall section and the exterior wall section, and an insulating, non-metallic material located in the gap. Preferably, the non-metallic insulating material is at least one of: (a) substantially empty space of a relative vacuum, (b) air at normal ambient air pressure, (c) an inert gas at either normal ambient air pressure or at a pressure less than ambient air pressure, (d) a foam insulation material other than Styrofoam™, (e) a substantially solid plastic insulating material, (f) Styrofoam™-like material and (g) an inert gas.

The object of the invention is also acquired partly by providing for use in a hot beverage brewing apparatus having a source of hot water, means for selectively dispensing the hot water at a dispense location, a releasable brew basket holder for supporting a brew basket beneath the dispense location to receive the hot water, and a dispenser urn for direct receipt of and temporary storage of the beverage, a method of brewing the hot beverage by performance of the steps of passing hot water into the open top of an insulated brew basket containing beverage ingredient from the hot water dispense location, insulating the brewing beverage to reduce heat and temperature loss with thermal insulation associated with the insulated brew basket, brewing the beverage ingredient with the hot water in the insulated brew basket while the step of insulating is being performed to reduce heat loss from the brewing beverage in the brew basket, passing the insulated brewed beverage from the insulated brew basket directly into the dispenser urn. The method preferably includes the step of insulating the beverage in the dispenser urn after receipt from the insulated brew basket to reduce heat and temperature loss of the beverage within the dispenser urn.

Preferably, the brew basket includes an exterior surface and the method includes the step of insulating the beverage within the insulated brew basket to reduce temperature of the exterior surface.

The object is also acquired in part by providing in a brewer assembly having a source of hot water, means for controlling the flow of the hot water from the source to a dispense location and to mix with ingredient within a brew basket to freshly brew hot beverage, an insulating brew basket assembly, having a metal insulated brew basket, and a brew basket holder for releasably holding the insulated brew basket during brewing.

Achievement of the invention is also acquired by provision of a hot beverage brewer composed of a metal brew basket, and an insulated brew basket holder for releasably holding the brew basket beneath a source of hot water.

BRIEF DESCRIPTION OF THE DRAWING

The foregoing objects and advantageous features of the brew basket, brewer and method of brewing of the present invention will be described in greater detail and further advantageous features will be made apparent from the detailed description given with reference to the several figures of the drawing, in which:

FIG. 4 is a sectional side view of another form of the brew basket assembly of the present invention that is alternatively used in the brewer of FIG. 1 in which the brew basket has a single-walled brew basket body made from stainless steel or the like, with both the exterior surface and the interior surface covered by an insulating material;

FIG. 5 is an enlarged portion of a brew basket housing like that of FIGS. 2-4 and alternatively used in the brewer of FIG. 1 but in which the brew basket body has a double walled for increased insulation via vacuum insulation, air gap insulation, inert gas insulation or other interstitial insulation, such a foam insulation, either with or without an insulating cover; and FIG. 6 is a schematic illustration of a brewer of the present invention in which either a conventional brew basket, or one of the insulated brew basket assemblies of FIGS. 2-5, is removably mounted within an insulating compartment pivotally or slidably attached to the brewer in order to achieve or enhance the desired reduction in heat loss and resultant reduction in temperature from the brew basket insulation.

DETAILED DESCRIPTION

Figure 1:
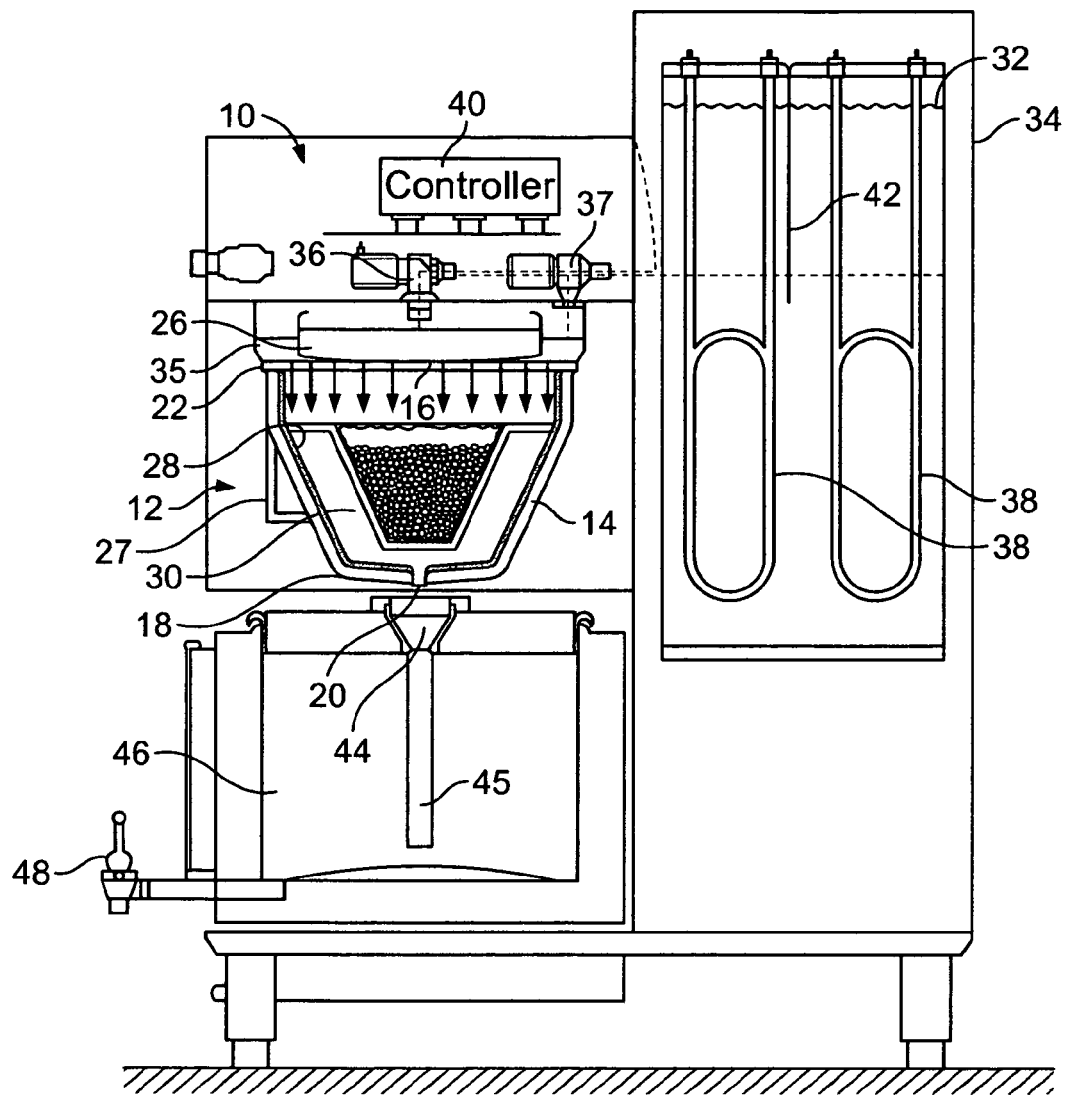
FIG. 1 is a brewer assembly of the present invention that employs one form of the insulated brew basket of the present invention.

Referring to FIG. 1, a preferred embodiment of the improved brewer 10 of the present invention, has an insulated brew basket assembly 12 with an insulated brew basket body 14 with an open top 16 and a bottom 18 with a drain hole 20. The top 16 has an outwardly extending pair of elongate or surrounding mounting tabs 22 on opposite sides that are slidably supported on a pair of mating, inwardly extending tracks of the brewer assembly 10. During a brew cycle the insulated brew basket body 14 is slid into the operative position directly beneath a showerhead 26. A handle 27 may be mounted to the front of the sidewall assembly 54 to facilitate handling of the brew basket assembly 12. A wire-basket filter holder 28 is preferably removably supported within the interior of the insulated brew basket body 14 above the bottom 18. The wire basket filter holder 28 is made of cross-connected wire that, in turn, supports a paper filter which, in turn, supports an amount of hot beverage ingredient 30, such as ground coffee, tea leaves or other like beverage ingredient. Alternatively, the filter is supported directly by the interior of the brew basket body 14 without the use of an intermediate filter holder 28 but this does not enable the use of by-pass water.

In either event, hot water 32 within a hot water tank 34 is selectively passed through a dispense valve 36 controlled by a microcomputer-based controller 40 into the showerhead 26. The showerhead 26 has a perforated bottom or the like that creates a generally uniform spray of hot water 32 that is distributed through the open top 16 and onto the top surface of the ingredient 30.

If a filter holder is used, a solenoid controlled, by-pass valve 37 responsive to the controller 40 selectively passes so-called "by-pass" hot water 32 from the hot water tank 34 to a by-pass gutter 35 of the showerhead 26. The by-pass gutter 35 is spaced outwardly from the outer edge of the filter holder 28, and water from the by-pass gutter 35 falls past ingredient 30, down the side of the brew basket body 14 and out of the drain hole 20 without mixing with the ingredient.

In addition to controlling the solenoid controlled valves 36 and 37 electrical heating elements 38 are controlled by the microcomputer-based controller 40 in response to signals received from a hot water tank temperature sensor (not shown) to maintain a preselected optimum hot water dispense temperature. The controller 40 also responds to signals from a level sensor 42 to maintain the level of the hot water 32 at a preselected level as shown in FIG. 1. The controller 40 performs various other functions and responds to manual switch actuations, such as from a start brew switch 42, for starting brew cycles and may have a display and keyboard (not shown) for interface with users, owners, or repair or installation technicians.

The hot water seeps or percolates slowly through the beverage ingredient and the salient constituent elements of the beverage ingredient dissolve into the hot water to form the freshly brewed beverage, freshly brewed coffee, tea or the like. The particulate matter is blocked but the liquid beverage passes through the filter paper and is funneled to and out through the drain hole 20 directly into an underlying adjacent inlet of a funnel assembly 44. The funnel assembly 44 passes the freshly brewed hot beverage though a down-tube 45 directly to a location adjacent the bottom 18 of the interior of an insulated dispensing urn 46. After the dispensing urn 46 is filled and a brew cycle is completed, it may be removed from the site of the brewer 10 and relocated to a serving station remote from the brewer 10 and remote from any source of A.C. electrical power. Another brew cycle may then commence with another identical empty dispenser 46.

In order for the new brew cycle to commence, an operator must first handle the brew basket body to slidably move it forwardly off the support rails beneath the spray head 26 to enable removal of the filter holder and filter with spent ingredient through the open top 16. Then either a new filter holder 28 with a filter and ingredient 30 is installed into the original brew basket body 14, the original filter holder 28 is reused and reloaded with a new filter paper and ingredient, or another preloaded brew basket body assembly 12 is employed while the first brew basket body 14 is washed and made ready with a new load of ingredient. In situations where the brew basket body is removed immediately after the conclusion of one brew cycle and before the temperature can drop to a safe level, there is a safety risk due to possible burn injury or due to dropping the brew basket because it is to hot to handle.

At the serving station, individual serving cups or serving decanters are filled via a manually-actuated faucet 48. The inlet opening to the funnel assembly 44 is closed after the dispenser 46 is filled to reduce the loss of heat. Also, the dispenser side-walls, top and bottom are insulated either by means of foam insulation or by means of vacuum insulation via a vacuum formed in the gap between a pair of parallel walls forming the various parts of the dispenser 46.

In order to obtain optimum flavor extraction while at the same time maximizing the temperature of the beverage as it enters the dispenser 46, the temperature must be hot but not too hot. In known beverage dispensers in order to obtain a desired temperature of the beverage as it leaves the brew basket, the temperature of the hot dispense water that is added to the top of the beverage ingredient must be set at a substantially higher temperature due to substantial heat loss from the conventional, non-insulated, brew basket assembly. In commercial brewers that carry large quantities of beverage and which must withstand the rigors of continuous commercial use, the brew baskets are all made of single-walled stainless steel that has a relatively high level of heat conductivity. Consequently, substantial heat loss from within the brew basket body via conduction through the single wall of the brew basket body. The brew cycle may take 3-5 minutes and during this time the temperature of the beverage falling from the drain hole 20 is significantly reduced relative to the temperature of the hot water that is added to the brew basket assembly 12 from the shower head 26. Accordingly, in order to obtain a given temperature of the beverage, the hot water dispensed into the brew basket assembly 12 must be sufficiently higher than the desired beverage temperature in order to compensate for the brew basket heat loss that occurs with the use of non-insulated brew baskets.

Unfortunately, such higher temperatures may be too high for optimum flavor extraction from the beverage ingredient. Nonetheless, a high beverage temperature is desired to maximize the length of time that the beverage will remain above a pre-selected minimum serving temperature. Once the hot beverage falls beneath the preselected minimum serving temperature, it is no longer served but is disposed of as waste. Thus, disadvantageously, in known brewers with highly heat conductive brew baskets, an unfortunate choice must be made between optimum flavor and a reduced hot beverage life duration and waste.

In accordance with present invention, not only is the dispenser insulated to reduce heat loss after the beverage has been brewed, or made, but the hot water added to the brew basket and the beverage forming in the brew basket is insulated. Accordingly, less heat is lost from the brew basket assembly 12, and the difference between the temperature of the hot water added to the brew basket to brew the beverage and the actual beverage temperature as the beverage leaves the brew basket assembly 10 is advantageously reduced. Specifically, in accordance with the present invention, the brew basket assembly 12 is insulated by one or more means illustrated in, and describe below with reference to, FIGS. 2-5. Any one of these different embodiments of FIGS. 2-5 may be used as the insulated brew basket assembly 12 of the present invention, or may be used within the insulated brew basket assembly holder of FIG. 6 to achieve even greater levels of heat loss reduction.

Figure 2:
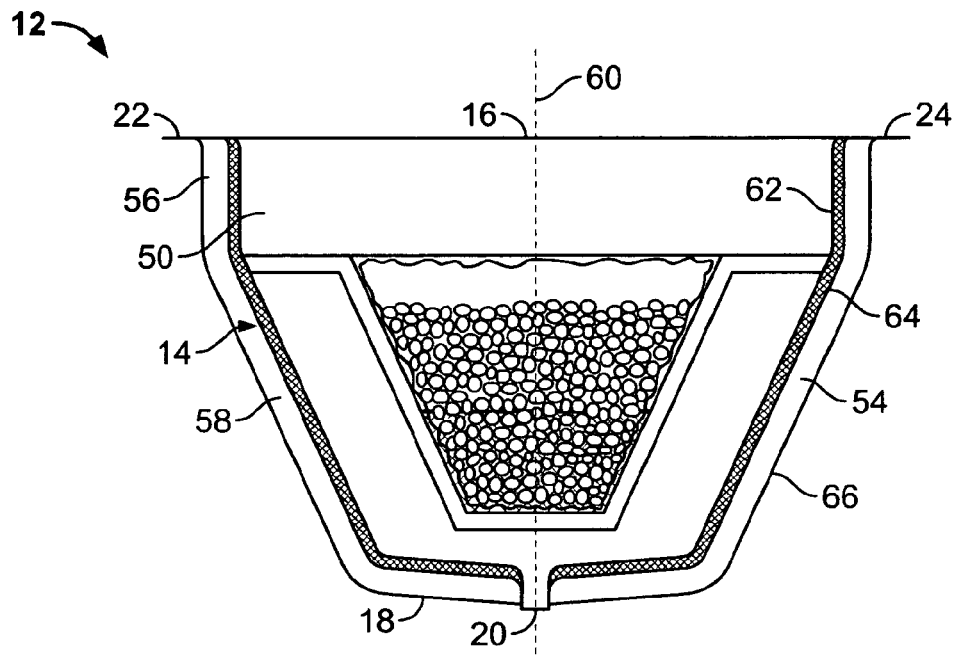
FIG. 2 is a sectional side view of the brew basket assembly of the present invention employed in the brewer of FIG. 1 in which the brew basket housing has a single-walled body of stainless steel or the like with an interior surface covered by an insulating material.

Referring to FIG. 2, in one form of the brew basket assembly 12 of FIG. 1, the brew basket assembly 12 has a water impervious brew basket body 14 with a continuous, surrounding sidewall 54 made of relatively rugged, non-corrosive and rigid material, such as stainless steel. The sidewall 54 extends between and surrounds the relatively narrow bottom 18 and the relatively wider open top 16. The sidewall assembly 54 has a generally cylindrical wall section 56 and conical or other inwardly tapered wall section 58. The shape of a horizontal cross-section of the brew basket body 54 perpendicular to an imaginary axis of symmetry 60 is preferably circular, as described, but other tapered shapes may be employed so long as the beverage automatically drains to the drain hole 20. The filter holder 28 is not shown to simplify the illustration but should be understood to be present during use of the insulated brew basket assembly 12 with the brewer 10 during a brew cycle.

Extending outwardly from top of the sidewall section 56 is the mounting collar, or mounting tab, 22 used to slidably mount and suspend the open top of the brew basket housing 50 directly beneath hot water spray head 26.

In known, commercial brew basket bodies the entire brew basket body is made from stainless steel. Stainless steel is preferred to other metals or materials because it is approved for contact with food, is generally impervious to staining, corrosion or dissolution into the beverage and is rugged. In commercial applications, the brew basket body must be sufficiently strong to hold large quantities of beverage ingredient employed in commercial brewers, in which 1-3 gallons or more of beverage are made during a single brew cycle, and to withstand the continuous cleaning and other handling often encountered in a commercial operation.

As previously noted, the temperature of the water is quite hot, approximately 190-205 degrees-Fahrenheit and is added to the top of the beverage ingredient 30 for approximately 3-5 minutes, depending on quantity and type of ingredient. The hot water percolates downwardly through the ingredient 30 and dissolves portions of the ingredient during the passage through the ingredient to produce the hot, freshly brewed beverage. It has been discovered by the present inventors that the passage of hot water into and through the brew basket body 14 results in heating the air within the interior 50 of the brew basket body 14 a temperature substantially greater than the surrounding ambient air within the room in which the beverage brewer is located, typically 65- to 75-degrees Fahrenheit. In conventional, non-insulated brew basket bodies, this substantial temperature differential, usually in excess of 100-degrees Fahrenheit, results in a substantial loss of thermal energy to the surrounding ambient air through conduction of heat thought the highly conductive metal sidewalls of the brew basket body and a resultant reduction in the temperature of the hot beverage as it passes from the brew basket body and into the insulated dispenser 46. Also, the by-pass hot water directly impinges on the interior surface of the lower conical portion of the brew basket body which results in a direct heat conduction from the by-pass hot water 32 through the sidewall. As noted, this heat loss also results in the outer surface of the stainless steel to become quite hot to the touch and thereby causes difficulty in handling the brew basket.

Figure 3:
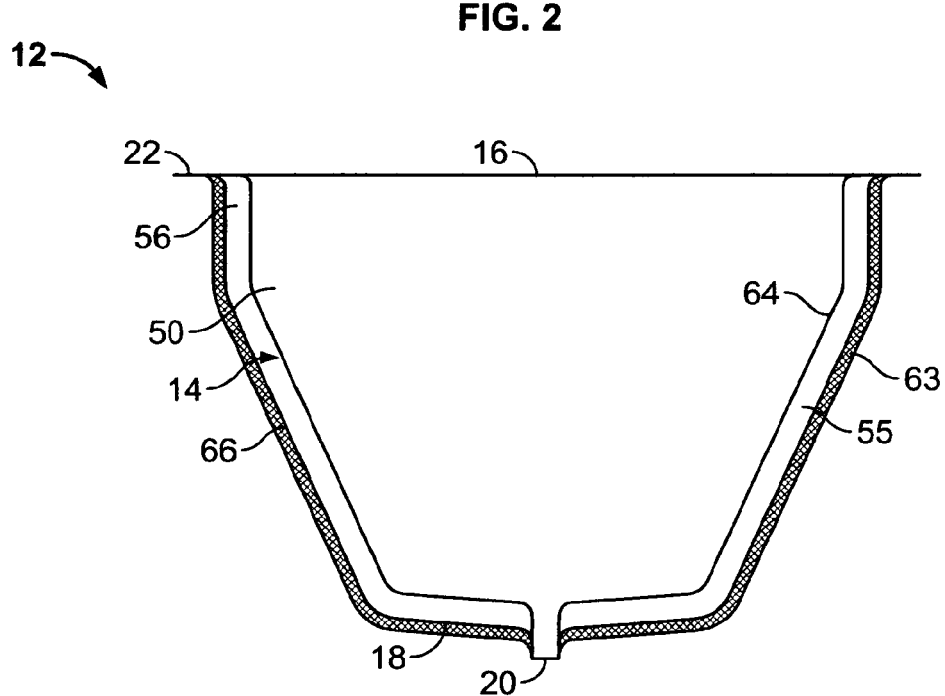
FIG. 3 is a sectional side view of another form of the brew basket assembly of the present invention and alternatively employed in the brewer of FIG. 1 in which the brew basket housing has a single-walled body of stainless steel or the like with an exterior surface covered by an insulating material.

In accordance with some forms of the present invention shown in FIGS. 2-4, the water impervious brew basket body 14 has a stainless steel or other relatively rigid brew basket shaped sidewall 54 that is combined with a nonmetallic, relatively thermal insulating covering material 62 covering preferably all but at least a portion of the surrounding sidewall 54. The covering insulating material has a heat conductivity characteristic that is significantly less than that of the surrounding sidewall to provide the insulation needed to achieve the objectives of the invention.

In the embodiment of FIG. 2, the insulating covering material 62 covers an inwardly facing, interior stainless steel surface 64 of the metal basket 55, but the outwardly facing, exterior stainless steel surface is left uncovered. In the embodiment of FIG. 3, and insulating covering material 63 covers an outwardly facing, exterior surface 66 of the metal basket 55, but the interior surface 64 is left uncovered. In the embodiment of FIG. 4, the insulating covering material 62 covers the interior surface 64 and the insulating covering material 63 covers the exterior surface 66 of the metal basket.

Preferably, the insulating material is any insulating plastic suitable for use with food. Preferably, Teflon® or Teflon®-like material that has been approved for use with food is used to cover the interior surface 64 to both obtain the desired insulating properties and enhancing cleanability. This non-metallic, insulating covering 62 substantially reduces the temperature loss of the hot beverage in the insulated brew basket body 14 compared to conventional brew baskets. Even though it is located on the interior surface 62, the maximum temperature reached by the outside surface of the brew basket assembly 12 to a level that is more comfortable for users to handle.

In the embodiment of FIG. 2, because the interior surface 64 of the stainless steel metal basket 55 is covered while the outside surface 66 of the basket 55 remains uncovered, the esthetic look of a conventional all-stainless steel brew basket body, as viewed from the outside of the brew basket assembly 12, is desirably maintained. Also, the outer steel surface 66 is generally tougher than the interior insulating surface covering material 62 and protectively encloses the insulating covering material 62 against external scrapes, dents, scratches and the like which might damage the nonmetallic insulating cover but not the metal of the metal basket 55.

In the embodiment shown in FIG. 3, in which the interior surface 64 of the metal surrounding sidewall is left uncovered by the insulating covering material 62, the insulating cover 62 is not exposed to the hot water dispensed into the brew basket as by-pass water or to the beverage that passes through the filter that drips onto interior surface of the lower part 66 of the brew basket body 14. This eliminates any possibility of scratching or dissolution or shedding of the insulating covering material 62 into the beverage. On the other hand, the insulating covering material 63 covering the exterior surface does not come into direct contact with the beverage, and consequently, use of a wider range of insulating materials may be possible for use.

In the embodiment of FIG. 4, in which both the interior surface 64 and the exterior surface 66 are covered with insulating covering material 62 and 63, respectively, the relative advantage compared to the embodiments of FIGS. 2 and 3, is that the same degree of insulation may be obtained with coverings that are relatively thinner, approximately one-half the thickness of each of the coverings of the embodiment of FIGS. 2 and 3. A thinner insulating covering 62 is believed to reduce the risk of cracking or other mechanical degradation from the thermal expansion and contraction of the stainless steel or other metal surrounding wall 54.

The inner insulating covering material 62 and the exterior covering material 63 may be provided as a coating that is permanently adhered to the stainless steel surface 64 or 66 by painting the surface or the like. Alternatively, in the case of covering the interior surface 64 in the embodiments of FIGS. 2 and 4, the insulating covering material 62 may be provided as an insulating liner with a shape and size that corresponds to that of the interior of the surrounding wall 54 of the brew basket body 14 that is received within the interior in conforming relationship with the interior and supported by the interior. The liner may have its own structural integrity or may be sufficiently flexible to conform to the interior. The liner may simply be releasably received within the interior and held in position solely by gravity. The liner may be made of disposable material that is only used a limited number of time and then removed and replaced with a new liner. Alternatively, the interior liner is attached to the interior surface 64 by means of suitable mating fasteners or other interlocking members or by means of a separate adhesive.

Alternatively, in the case of covering the exterior surface 66 of the brew basket body 14, as shown in FIGS. 3 and 4, the insulating cover 62 may be provided as a self-supporting, insulating jacket within which the metal basket is releasably received. In such case the insulated brew basket assembly 12 may be constructed by permanently or semi-permanently attaching the exterior insulating jacket to the exterior surface 66 by means of suitable mating fasteners or other interlocking members or by means of adhesive. The outer jacket may be sufficiently flexible to conform to the exterior surface 66 or it may be provided as a self-supporting jacket that has an interior size and shape conforming to the exterior surface 66 and within which the brew basket body 14 is snugly nestled. In the case of either the interior liner member or the exterior outer shell or insulating jacket member not being disposable, preferably the insulating member is mechanically attached to the stainless steel brew basket body component.

In the case of either an interior insulating liner or an exterior insulating jacket that are not adhered to the brew basket body, there is generally provided an insulating air gap between the brew basket body and the liner or jacket to provide additional insulation.

As noted, the attachment may be relatively permanent with no intention of the user separating the stainless steel component from the insulating jacket or liner. Alternatively, the mechanical connection is a relatively releasable. If the insulating member is flexible, then the mechanical connection is provide by mating male and female connectors that flexibly snap fit together but which may be separated. A releasable liner or jacket may be used in retrofit applications to insulate existing all-metal brew baskets.

In the case of manufacturing the insulated brew basket as original equipment provided with the beverage brewer, it may be preferred to provide the insulating surface cover by means of coating the surface in which the insulating material layer is adhered to the stainless steel surface of the stainless steel body. Alternatively, in the case of retrofit applications, the insulated covering material is added to an existing, non-insulated, conventional stainless steel or other unitary metal brew basket body.

Referring to FIG. 5, the stainless steel surrounding wall in all of the embodiments of FIGS. 1-4, may have a double-walled construction with a space, or gap, 68 located between an inner wall 70 and an outer wall 72, both made of metal, preferably stainless steel. The two walls are interconnected by suitable welds. The interior space of the gap 168 is either evacuated to provide vacuum insulation, filled with an inert gas, such as Argon gas, filled with air, or is filled with a conventional foam insulation, fiberglass, plastic, or the like. As shown in the upper segment of FIG. 5, even when there is a double-wall construction the exterior surfaces 64 and 66 may still be additionally insulated by insulating covering material 62.

Alternatively, as shown in the bottom segment of FIG. 5, the insulation provided by the double wall construction alone will provide improved insulation relative to a brew basket body of conventional solid wall steel construction, particularly if the gap is evacuated, filled with inert gas or partly or completely filled with other insulation material, such as foam insulation. Alternatively, the interior surfaces of the gap 68 may be coated a suitable insulating material either alone or in combination with the other insulating materials noted above.

If no additional external insulation is desired, the use of the nonmetallic covering of insulating material on either the interior or the exterior may be dispensed with. The relative advantage of this embodiment compared to the single-walled embodiment is that the totally steel brew basket body is less prone to damage from ordinary wear and tear than the plastics and other materials contemplated for use as the insulating covering. Another advantage of providing the insulation within the gap 68 is that the insulation is protected by the metal walls 70 and 72 against moisture and mechanical damage. In addition, the additional materials and assembly costs associated with a non-metallic cover are eliminated. It should be appreciated that if there is not a double-wall construction, then the non-metallic cover must be provided on at least one of the surfaces 64 and 66.

Still referring to FIG. 5, while stainless steel or other like metal is preferred for the walls 70 and 72, the invention also contemplated making the walls 70 and 72 of non-metallic insulating material such a plastic or other like synthetic. The double walled construction enables use of such a material by enhancing the structural integrity of the brew basket body.

In accordance with the method of brewing of the present invention, the hot water is added to ingredient within an insulated, removably mounted brew basket assembly to insulate the hot water and beverage being brewed within the brew basket assembly to reduce heat loss from within the brew basket assembly and reduce the temperature differential between that of the hot water when first added to the brew basket and the temperature of the freshly brewed beverage as it passes out of the brew basket through the drain hole 20. The method continues by the step of passing the insulated beverage from an insulated brew basket directly into an insulated beverage dispenser for, mixing, temporary storage, or service at a location remote from the brewer. Thus, heat insulation is maintained throughout the brewing, mixing, storage and service processes.

Also, in accordance with the method of the invention, prior to the step of passing the insulated brew basket assembly is performed by inserting a metal brew basket body inside an insulating jacket, inserting an insulating liner inside the metal basket or performing both insertions. Preferably, the insulating jacket and the insulating liner are made of a plastic material approved for use with food. The method also includes the step of removing either or both of the jacket and liner after the step of passing, disposing of the jacket, liner or both and replacing the disposed jacket, liner or both with an unused jacket, liner or both, respectively.

In accordance with another embodiment of the invention, as shown in FIG. 6, the brewer 10 is provided with an insulated enveloping compartment 80 within which the brew basket is held beneath a source of water. The compartment has a door 82 that is opened to install a regular metal or an insulated brew basket 84 into the insulated brew basket compartment or holder 80 and then closed to maintain the insulating properties of the insulated brew basket compartment 80 during the brew cycle. Alternatively, the brew basket compartment, or holder, 80 may be slidably mounted to the brewer. In such case, the brew basket compartment has an open top through which access to the brew basket may be gained when the insulated brew basket compartment is slid to a forward position slid to an inoperative open position to provide access to the brew basket within the interior for loading and unloading. In either event, the insulating brew basket holder 80 surrounds and insulates the brew basket from the exterior ambient air during the brewing process. Preferably, the brew basket holder has at least one wall with a double wall construction with a pair of interconnected walls separated by a gap, and the metal brew basket holder is insulated within the gap by at least one of (a) substantially empty space of a relative vacuum, (b) air at normal ambient air pressure, (c) an inert gas, (d) a foam insulation material and (e) a substantially solid plastic insulating material, (f) Styrofoam-like material. Preferably, all the walls and the door 82 are so formed and insulated. In addition, the brew basket holder may have at least one and preferably all of the constituent walls covered by a suitable insulating material, such as foam insulation material, a substantially solid plastic insulating material, a Styrofoam®-like material, Teflon®-like material or any of the other insulation materials note above.

While a particular embodiments of the brewer with insulated brew basket, the insulated brew basket and the method of brewing with an insulated brew basket, it will be appreciated by those skilled in the art that many equivalents and other obvious variations may exists that remain within the scope of the present invention.

The invention claimed is:

1. An insulated brew basket assembly, comprising:
a water impervious, brew basket body having a surrounding, metal sidewall of single-wall construction with an inwardly facing exterior surface extending between and surrounding
a relatively narrow bottom with a drain hole, and
a relatively wider open top, for receipt of and direct contact with beverage ingredient and mixing liquid; and
a nonmetallic, insulating, solid, covering material
covering at least a portion of the inwardly facing exterior surface of the surrounding metal sidewall, and
having a heat conductivity characteristic that is significantly less than that of the metal sidewall.

2. The insulated brew basket assembly of claim 1 in which substantially the entirety of the inwardly facing surface is covered by the nonmetallic, insulating, solid covering material.

3. The insulated brew basket assembly of claim 1 in which at least a portion of the inwardly facing exterior surface is covered by the nonmetallic, insulating, solid covering material.

4. The insulated brew basket assembly of claim 1 in which
the surrounding wall has an outwardly facing exterior surface, and
substantially the entirety of both the inwardly facing exterior surface and the outwardly facing exterior surface are covered by the nonmetallic, insulating, solid covering material.

5. The insulated brew basket assembly of claim 1 in which the nonmetallic, insulating, solid covering material is a self-supporting, nonmetallic liner received within the brew basket body and conforming to and covering at least a significant portion of the inwardly facing surface and (b) a coating of insulated material that is permanently adhered to the inwardly facing exterior surface.

6. The insulated brew basket assembly of claim 5 in which
one of the liner and the jacket is fixedly attached to the metallic brew basket body adhesive.

7. The insulated brew basket assembly of claim 5 in which the liner is made from a one of (a) Styrofoam, and (b) other water impermeable insulating plastic.

8. The insulated brew basket assembly of claim 5 the nonmetallic, insulating, solid covering material is a coating adhered to the exterior surface made from one of (a) a Teflon®-like material and (b) other water impermeable insulating plastic.

9. The insulated brew basket assembly of claim 1 in which the insulating covering material is one of (a) a foam insulation filling the gap and (b) substantially empty space of a vacuum.

10. The insulated brew basket assembly of claim 1 in which the brew basket body is made of relatively rigid metal.

11. The insulated brew basket assembly of claim 10 in which the metal is stainless steel.

12. The insulated brew basket assembly of claim 1 in which the nonmetallic, insulating, solid covering material covering the inwardly facing exterior surface is one of (a) Teflon®, (b) Teflon®-like material, (c) insulating plastic, (d) other insulating material that is substantially water impermeable and (e) a jacket made of Styrofoam-like material.

13. The insulated brew basket assembly of claim 1 in combination with
   a hot beverage brewing apparatus having a source of hot water,
   means for selectively dispensing the hot water at a dispense location,
   a releasable brew basket holder for supporting the insulated brew basket assembly beneath the dispense location to receive the hot water, and
   an insulated dispenser urn for direct receipt of and temporary storage of the hot beverage received from the insulated brew basket assembly.

14. An insulated brew basket assembly, comprising:
   a water impervious, brew basket body having a surrounding, sidewall of single-wall construction extending between and surrounding
      a relatively narrow bottom with a drain hole, and
      a relatively wider open top for receipt of beverage ingredient and mixing liquid; and
   a nonmetallic, insulating, solid, covering material
      covering at least a portion of the surrounding sidewall, and
      having a heat conductivity characteristic that is significantly less than that of the sidewall,
   said nonmetallic, insulating, solid, covering material being one of (a) a liner received within the brew basket body and conforming to and covering at least a significant portion of the inwardly facing surface and (b) a jacket within which the brew basket body is received and conforming to and covering at least a significant portion of the exterior facing surface, an air gap being created between the one of the liner and the jacket, on the one hand, and the inwardly facing or outwardly facing surface being covered to provide air gap insulation, on the other hand.

15. The insulated brew basket assembly of claim 14 in which the covering material is the liner.

16. The insulated brew basket assembly of claim 14 in which the insulating covering is the jacket.

17. The insulated brew basket assembly of claim 14 in which substantially the entire surrounding sidewall is covered by the covering material.

18. The insulated brew basket assembly of claim 14 in which the surrounding sidewall has an inwardly facing exterior surface that is at least partly covered by the covering insulating material.

19. An insulated brew basket assembly, comprising:
   a generally cup-shaped, brew basket body with an open top and a bottom with a drain hole and having a surrounding sidewall, said surrounding sidewall having a double-wall construction with an interior wall section fixedly connected with an exterior wall section in spaced relationship to define a permanently sealed closed gap between the interior wall section and the exterior wall section, said drain hole being formed by aligned holes in both the interior wall section and the exterior wall section interconnected by a sealed passageway extending across the permanently sealed close gap to pass beverage directly from an interior surface of the interior wall section and an exterior of the exterior wall section, and
   an insulating, nonmetallic material permanently located within the gap.

20. The insulated brew basket assembly of claim 19 in which the surrounding sidewall is made from metal.

21. The insulated brew basket assembly of claim 19 in which the nonmetallic insulating material substantially fills the entire gap.

22. The insulated brew basket assembly of claim 21 in which the gap is substantially coextensive with the entire surrounding sidewall.

23. The insulated brew basket assembly of claim 19 in which the gap is substantially coextensive with the entire surrounding sidewall.

24. The insulated brew basket assembly of claim 19 in which the only insulating material in the gap is an inert gas.

25. The insulated brew basket assembly of claim 19 in which the brew basket body including the interior wall section and the exterior wall section are made of stainless steel.

26. The insulated brew basket assembly of claim 19 in combination with
   a hot beverage brewing apparatus having a source of hot water,
   a faucet for selectively dispensing the hot water at a dispense location,
   a releasable brew basket holder for supporting a brew basket beneath the dispense location to receive the hot water, and
   a dispenser urn for direct receipt of and temporary storage of the beverage.

27. The insulated brew basket assembly of claim 26 in which the dispenser urn is insulated and has no source of electrical power or heat source.

28. An insulated brew basket assembly, comprising:
   a water impervious, brew basket body having a surrounding, sidewall of single-wall construction extending between and surrounding
      a relatively narrow bottom with a drain hole, and
      a relatively wider open top for receipt of beverage ingredient and mixing liquid; and
   a nonmetallic, insulating, solid, covering material
      covering at least a portion of the surrounding sidewall, and
      having a heat conductivity characteristic that is significantly less than that of the sidewall and in which the nonmetallic, insulating covering material is one of
   (a) a liner received within the brew basket body and conforming to and covering at least a significant portion of the inwardly facing surface, and
   (b) a jacket within which the brew basket body is received and conforming to and covering at least a significant portion of the exterior facing surface, the one of the insulating liner and the insulating jacket being releasably attached to the metallic brew basket body.

29. The insulated brew basket assembly of claim 28 in which the covering material is the liner.

30. The insulated brew basket assembly of claim 28 in which the insulating covering is the jacket.

31. The insulated brew basket assembly of claim 28 in which substantially the entire surrounding sidewall is covered by the covering material.

32. The insulated brew basket assembly of claim 28 in which the surrounding sidewall has an inwardly facing exterior surface that is at least partly covered by the covering insulating material.

33. An insulated brew basket assembly, comprising:
   a water impervious, metallic brew basket body, made of metal for receipt of and direct contact with beverage ingredient and mixing liquid and having
      a surrounding, sidewall of single-wall construction extending between and surrounding a relatively narrow bottom with a drain hole, and a relatively wider open top, and
      an inwardly facing exterior surface on the inside of the brew basket body and an outwardly facing exterior surface on the outside of the body, and;
   a nonmetallic, insulating, solid, exterior surface-covering material
      covering at least a portion of the surrounding sidewall, and
      having a heat conductivity characteristic that is significantly less than that of the metal of the brew basket body that covers at least a portion of the at least one of the inwardly facing exterior surface and the outwardly facing exterior surface.

34. The insulated brew basket assembly of claim 33 in which substantially the entirety of both the inwardly facing surface and the outwardly facing surface is covered by the exterior covering insulating material.

35. The insulated brew basket assembly of claim 33 in which the exterior surface nonmetallic covering material is one of (a) a jacket within which the brew basket body is received and conforming to and covering the exterior facing surface, and (b) a coating of insulated material that is adhered to the outwardly facing surface.

36. The insulated brew basket assembly of claim 35 in which the jacket is fixedly attached to the metallic brew basket body.

37. The insulated brew basket assembly of claim 35 in which both of the inwardly facing exterior surface and the outwardly facing exterior surface are covered by the exterior covering nonmetallic insulating material.

38. The insulated brew basket assembly of claim 35 in which the one of the liner and the jacket is fixedly attached to the metallic brew basket body by one of (a) adhesive, and (b) permanent mechanical fasteners.

39. The insulating brew basket assembly of claim 38 in which the one of the liner and the jacket is fixedly attached to the metallic brew basket body by the permanent mechanical fasteners.

40. The insulating brew basket assembly of claim 38 in which the one of the liner and the jacket is fixedly attached to the metallic brew basket body by the adhesive.

41. The insulated brew basket assembly of claim 35 in which the exterior covering insulating material is one of (a) Teflon®, (b) Teflon®-like material, (c) insulating plastic, and (d) other insulating material that is substantially water impermeable, and (e) a jacket made of Styrofoam-like material.

42. The insulated brew basket assembly of claim 35 in which the insulating covering material is the jacket.

43. The insulated brew basket assembly of claim 35 in which the insulating covering material is the coating.

44. The insulated brew basket assembly of claim 33 in which the insulating material covers only at least a portion of the inwardly facing exterior surface.

45. The insulating basket assembly of claim 33 in which the insulating material covers only at least a portion of the outwardly facing exterior surface.

46. The insulating basket assembly of claim 33 in which the insulating material covers both the inwardly facing exterior surface and the outwardly facing exterior surface.

47. An insulated brew basket assembly, comprising:
   a water impervious, brew basket body having a surrounding, sidewall extending between and surrounding
      a relatively narrow bottom with a drain hole, and
      a relatively wider open top for receipt of beverage ingredient and mixing liquid; and
   a nonmetallic, insulating, covering material
      covering at least a portion of the surrounding sidewall, and
      having a heat conductivity characteristic that is significantly less than that of the sidewall,
   said water impervious brew basket body being a metallic brew basket body made of metal and having an inwardly facing exterior surface on the inside of the brew basket body and an outwardly facing exterior surface on the outside of the body,
   the insulating material including an exterior surface covering nonmetallic insulating material with a heat conductivity characteristic that is significantly less than that of the metal of the brew basket body that covers at least a portion of the at least one of the inwardly facing exterior surface and the outwardly facing exterior surface,
   said exterior surface nonmetallic covering material being one of (a) a liner received within the brew basket body and conforming to and covering the inwardly facing surface, and (b) a jacket within which the brew basket body is received and conforming to and covering the exterior facing surface, with an air gap being created between the one of the of liner and the jacket, on the one hand, and the associated exterior surface, on the other hand, to provide air gap insulation.

48. The insulating brew basket assembly of claim 47 in which the insulating covering material is the liner covering the inwardly facing exterior surface.

49. The insulating brew basket assembly of claim 47 in which the insulating covering material is the jacket covering the outwardly facing interior surface.

50. An insulated brew basket assembly, comprising:
   a water impervious, brew basket body having a surrounding, sidewall extending between and surrounding
      a relatively narrow bottom with a drain hole, and
      a relatively wider open top for receipt of beverage ingredient and mixing liquid; and
   a nonmetallic, insulating, covering material
      covering at least a portion of the surrounding sidewall, and
      having a heat conductivity characteristic that is significantly less than that of the sidewall,
   said water impervious brew basket body being a metallic brew basket body made of metal and having an inwardly facing exterior surface on the inside of the brew basket body and an outwardly facing exterior surface on the outside of the body,
   the insulating material including an exterior surface covering nonmetallic insulating material with a heat conductivity characteristic that is significantly less than that of the metal of the brew basket body that covers at least a portion of the at least one of the inwardly facing exterior surface and the outwardly facing exterior surface,
   said exterior surface nonmetallic covering material being one of (a) a liner received within the brew basket body and conforming to and covering the inwardly facing surface, and (b) a jacket within which the brew basket body is received and conforming to and covering the exterior facing surface, the one of the insulating liner and the insulating jacket being releasably attached to the metallic brew basket body.

51. The insulating brew basket assembly of claim 50 in which the insulating covering material covers substantially the entirety of at least one of the inwardly facing exterior surface and the inwardly facing exterior surface.

52. The insulating brew basket assembly of claim 50 in which the insulating covering material is the liner covering the inwardly facing exterior surface.

53. The insulating brew basket assembly of claim 50 in which the insulating covering material is the jacket covering the outwardly facing exterior surface.

54. An insulated brew basket assembly, comprising:
a water impervious, brew basket body having a surrounding, sidewall extending between and surrounding
a relatively narrow bottom with a drain hole, and
a relatively wider open top for receipt of beverage ingredient and mixing liquid; and
a nonmetallic, insulating, covering material
covering at least a portion of the surrounding sidewall, and
having a heat conductivity characteristic that is significantly less than that of the sidewall.
in combination with
a hot beverage brewing apparatus having a source of hot water,
means for selectively dispensing the hot water at a dispense location,
a releasable brew basket holder for supporting a insulated brew basket assembly beneath the dispense location to receive the hot water, and
an insulated dispenser urn for direct receipt of and temporary storage of the hot beverage received from the insulated brew basket assembly, and in which
the brew basket holder is contained within an insulated compartment within which the insulated brew basket is releasably supported.

55. The insulated brew basket assembly of claim 54 in which the covering material covers substantially the entirety of at least one exterior side of the surrounding sidewall.

56. The insulated brew basket assembly of claim 54 in which the surrounding sidewall has an inwardly facing exterior surface and the covering material covers at least a portion of inwardly facing exterior surface.

57. The insulated brew basket assembly of claim 54 in which the surrounding sidewall has an outwardly facing exterior surface and the covering material covers at least a portion of the outwardly facing exterior surface.

58. The insulated brew basket assembly of claim 54 in which the surrounding sidewall has a double-walled construction with an inwardly facing interior surface and an outwardly facing interior surface within an interior gap and the insulating covering material covers at least one of the inwardly facing interior surface and the outwardly facing interior surface.

59. The insulated brew basket assembly of claim 58 in which the insulating covering material covers the inwardly facing interior surface.

60. The insulated brew basket assembly of claim 59 in which the insulating covering material covers the outwardly facing interior surface.

61. The insulating brew basket assembly of claim 59 in which the insulating covering material covers both the inwardly facing interior surface and the outwardly facing interior surface.

62. The insulating brew basket assembly of claim 54 in which the surrounding sidewall has an inwardly facing exterior surface and an outwardly facing exterior surface and the insulating covering material covers at least a portion of both the inwardly facing exterior surface and the outwardly facing exterior surface.

63. The insulated brew basket assembly of claim 54 in which the insulating covering material is Teflon® or a Teflon®-like insulating material.

64. The insulating brew basket assembly of claim 54 in which the surrounding sidewall has a double-wall construction and insulating covering material is a relatively evacuated gap between two wall members.

65. The insulating brew basket assembly of claim 54 in which the surrounding sidewall has a double-wall construction and insulating covering material is an inert gas substantially exclusively filling a gap between two wall members.

66. The insulating brew basket assembly of claim 54 in which the insulating covering material is a liner received within the brew basket body.

67. The insulating brew basket assembly of claim 54 in which the insulating covering material is a jacket within which the brew basket body is received.

68. The insulating brew basket assembly of claim 54 in which the surrounding wall is made from metal with an outwardly facing exterior surface and an inwardly facing exterior surface and only the inwardly facing exterior surface is covered by the insulating covering material.

69. The insulating brew basket assembly of claim 68 in which the insulating material is adhered to the inwardly facing exterior surface.

70. The insulating brew basket assembly of claim 54 in which the surrounding wall is stainless steel.

71. The insulating brew basket assembly of claim 54 in which the insulating material is a coating adhered to the surrounding wall.

72. The combination of an insulated brew basket assembly with a hot beverage brewing apparatus, comprising:
an insulated brew basket assembly with a generally cup-shaped, brew basket body with an open top and a bottom with a drain hole and having a surrounding sidewall, said surrounding sidewall having a double-wall construction with an interior wall section fixedly connected with an exterior wall section in spaced relationship to define a permanently sealed closed gap between the interior wall section and the exterior wall section, the inner wall and the outer wall welded together to form a gap sealed against air, said drain hole being formed by aligned holes in both the interior wall section and the exterior wall section interconnected by a sealed passageway extending across the permanently sealed close gap to pass beverage directly from an interior surface of the interior wall section and an exterior of the exterior wall section, and
an insulating, nonmetallic material permanently located in the gap, said material being one of (a) inert gas and (b) only inert gas; and
a hot beverage brewing apparatus having
a source of hot water,
means for selectively dispensing the hot water at a dispense location,
a releasable brew basket holder for supporting the insulated brew basket assembly beneath the dispense location to receive the hot water, and
a dispenser urn for direct receipt of and temporary storage of the hot beverage received from the insulated brew basket assembly.

73. The insulated brew basket assembly of claim 72 in which the insulating covering material is only inert gas.

* * * * *